Figure 2:
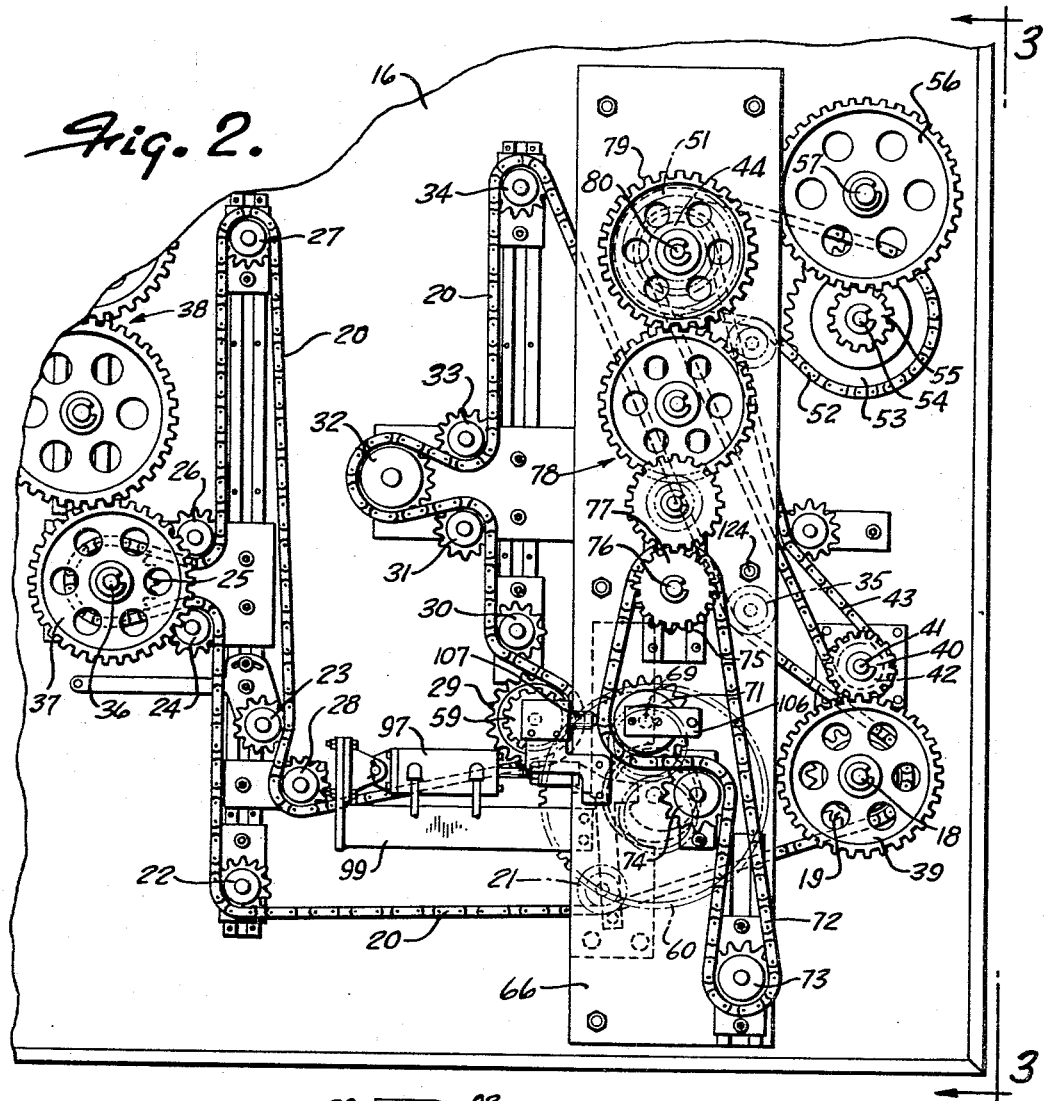

Aug. 8, 1967  W. G. McCLEAN  3,334,826
FILAMENT WINDING APPARATUS
Filed Feb. 10, 1965  3 Sheets-Sheet 1
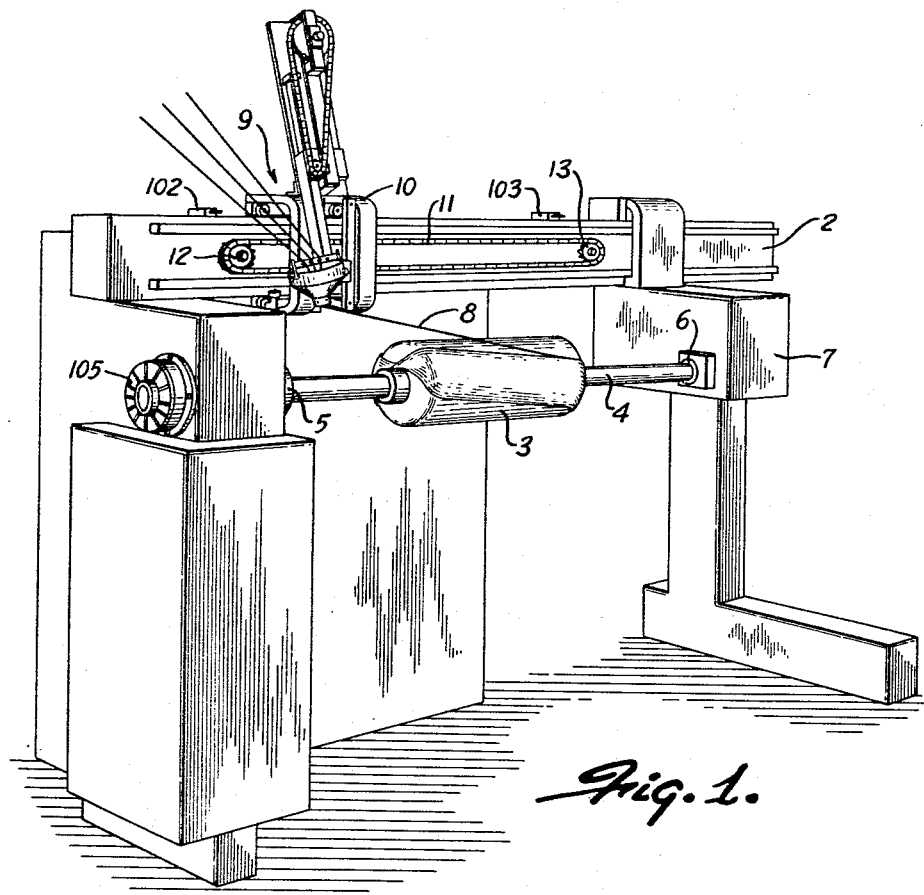
Fig. 1.
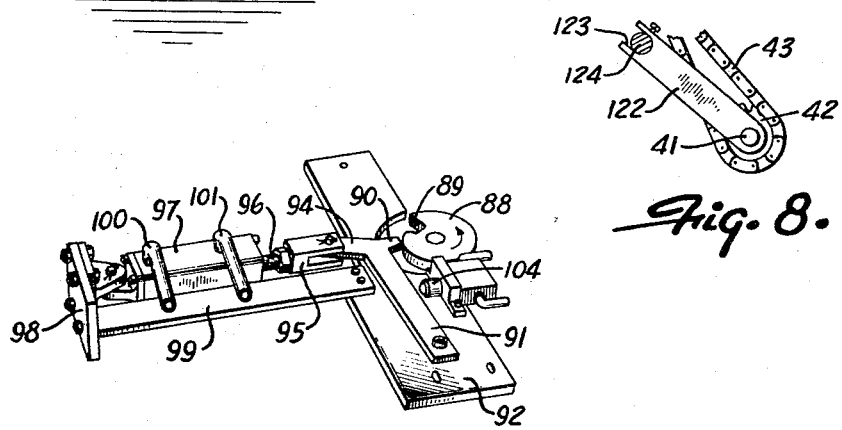
Fig. 8.
Fig. 4.
INVENTOR.
WILLIAM GEORGE McCLEAN
BY
Andrus & Starke
ATTORNEYS Aug. 8, 1967  W. G. McCLEAN  3,334,826
FILAMENT WINDING APPARATUS
Filed Feb. 10, 1965  3 Sheets-Sheet 2

INVENTOR.
WILLIAM GEORGE McCLEAN
BY
Andrus & Starke
ATTORNEYS

Aug. 8, 1967
W. G. McCLEAN
3,334,826
FILAMENT WINDING APPARATUS
Filed Feb. 10, 1965
3 Sheets-Sheet 3
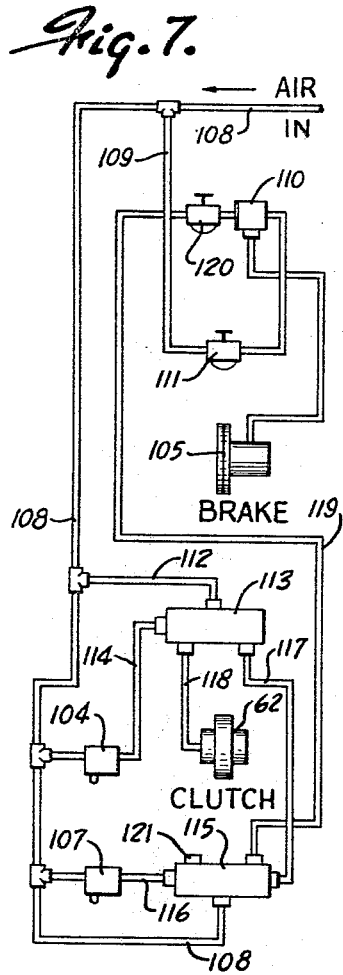
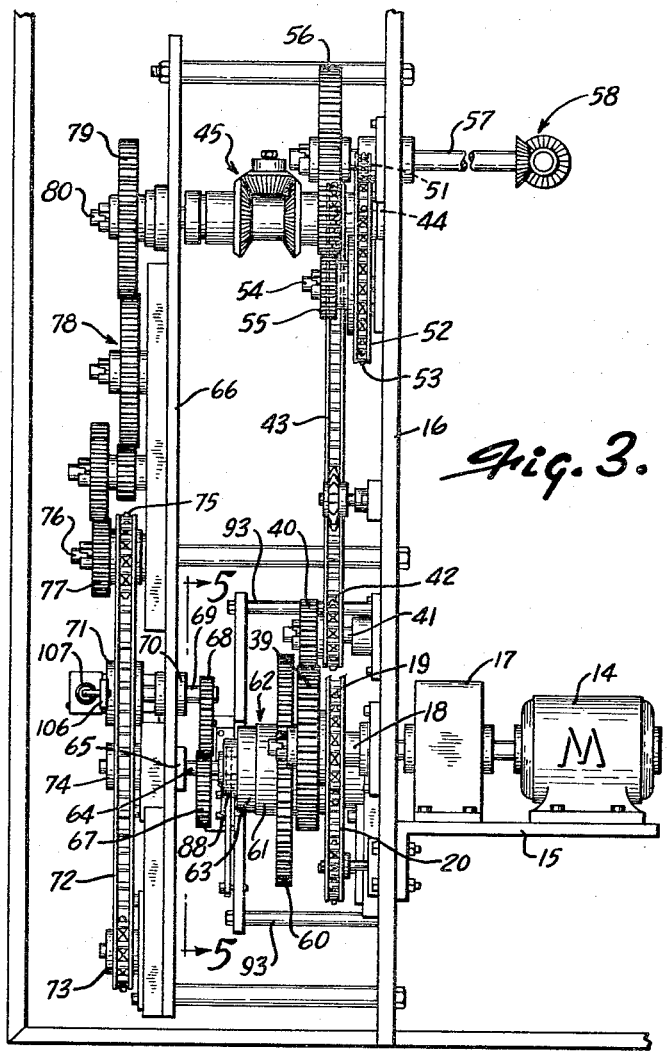
INVENTOR.
WILLIAM GEORGE McCLEAN
BY
Andrus & Starke
ATTORNEYS

United States Patent Office 3,334,826
Patented Aug. 8, 1967

3,334,826
FILAMENT WINDING APPARATUS
William George McClean, Milwaukee, Wis., assignor to McClean-Anderson, Inc., Milwaukee, Wis., a corporation of Wisconsin
Filed Feb. 10, 1965, Ser. No. 431,518
16 Claims. (Cl. 242—2)

This invention relates to a filament winding apparatus and more particularly to a mechanism for increasing the speed of mandrel rotation at programmed intervals in the winding cycle.

Fiber reinforced resin articles are fabricated by winding a strand of reinforcing material in a generally helical pattern in a number of superimposed layers on a rotating mandrel. In some cases, longitudinal windings or windings of a low helix angle in a range of 3° to 4° are included in the winding pattern to increase the beam strength of the article.

When applying windings of a low helix angle, the strand is guided onto the mandrel by a carriage which reciprocates along the length of the mandrel, and the mandrel is rotated at a slow speed with respect to the speed of carriage movement. As the carriage reaches an end point in its stroke of travel, it is necessary to provide a substantial period of carriage dwell before the carriage can begin its reverse travel in order to permit the mandrel to rotate approximately 180° in preparation for applying the next helical layer of windings. To speed up the overall winding program when winding at low helix angles, it is desirable to increase the speed of mandrel rotation when the carriage is dwelling at the end points of its reciprocating stroke of travel so that the length of the periods of carriage dwell can be minimized, thereby increasing the speed of the winding operation.

The present invention is directed to a mechanism for providing an increased speed of rotation for the mandrel at programmed intervals in the winding cycle. More specifically, the winding apparatus includes a differential gear unit having a pair of input members and output member connected to the mandrel. In the differential, the speed of the output member is equal to one-half the algebraic sum of the speeds of the two input members. One of the input members is connected by a chain drive to the main drive of the machine so that the mandrel will continually rotate at a slow rate of speed. In addition, a secondary drive system is connected to the second input member of the differential and the secondary drive is connected by a clutch to the main drive. The secondary drive is provided with a substantially higher rate of speed than the first chain drive so that when the clutch is engaged the second input member of the differential will have a greater speed than the first input member.

When the carriage reaches the end point in its stroke of travel, the clutch is engaged to drive the secondary drive system and thereby drive the second input member of the differential, with the result that the speed of the output member of the differential is increased, the output speed being one-half the algebraic sum of the two input speeds, and this increases the speed of rotation of the mandrel. After the mandrel has been rotated approximately 180°, the clutch is disengaged and the mandrel will then again rotate at the slow rate for the reverse stroke of travel of the carriage.

The invention can also be utilized when applying straight longitudinal windings to the mandrel. When applying longitudinal windings, the mandrel does not rotate, but after the carriage reaches an end point in its reciprocating stroke of travel, the mandrel is then rotated through an arc of about 180°. The carriage then moves in the reverse stroke of travel to apply a second longitudinal winding which is displaced approximately 180° from the first longitudinal winding.

The apparatus of the invention also includes a brake mechanism which is associated with the mandrel shaft. As the mandrel in many cases may have substantial size and weight, it is difficult to control the deceleration of the mandrel because of the inertia. Thus, a brake mechanism is employed which is actuated after the mandrel has rotated approximately 90° and the brake serves to decelerate the mandrel.

The mechanism of the invention enables the mandrel to rotate rapidly at the end points of the stroke of travel of the carriage. This increased speed of mandrel rotation is particularly important when winding at low helix angles, in which case the mandrel is normally rotating at a very slow rate of speed, or when applying longitudinal wrappings in which case the mandrel is not rotating as the longitudinal wrapping is being applied.

Figure 5:
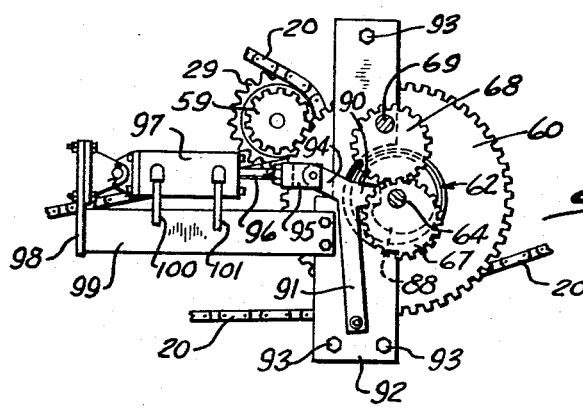

In the drawings:
FIG. 1 is a perspective view of a filament winding machine incorporating the invention;
FIG. 2 is a fragmentary rear elevation showing the drive mechanism;
FIG. 3 is a view taken along line 3—3 of FIG. 2;
FIG. 4 is a perspective view of the clutch operating mechanism;
FIG. 5 is a view taken along line 5—5 of FIG. 3;
FIG. 6 is a vertical section of the differential gear unit;
FIG. 7 is a diagrammatic representation of the pneumatic circuit; and
FIG. 8 is a fragmentary rear elevation of the drive mechanism showing a modified form of the invention used when applying longitudinal windings to the mandrel.

The drawings illustrate a filament winding machine which includes a cabinet or casing 1 and a generally horizontal beam 2 extends outwardly from the casing. A mandrel 3 is secured to a shaft 4 which is located generally parallel to the beam 2.

To rotate the mandrel about its axis, one end of the shaft 4 is connected to a drive spindle 5, while the opposite end of the shaft 4 is connected to an idler spindle 6 mounted on a tailstock 7 which is movable along the length of the beam 2.

A strand or band 8 of fibrous material is adapted to be guided onto the rotating mandrel 3 by a winding head 9 mounted on a carriage 10 which moves in a reciprocating path of travel along the beam 2.

The strand 8 can be in the form of substantially continuous unidirectional fibers, woven fabric, braided tubing, matting or the like. The fibrous material can be mineral fibers, such as glass or asbestos; vegetable fibers, such as cotton; animal fibers, such as wool; synthetic fibers, such as nylon, rayon or Dacron; or metal fibers, such as steel wire.

The strand 8 is impregnated or coated with a thermoplastic or thermosetting resin and the resin at the time the strand is wound on the mandrel can either be in the liquid uncured state or it can be in a partially cured, solid, deformable state. Glass fibers impregnated with an epoxide resin formed by the reaction of epichlorohydrin and bisphenol A, as disclosed in Patent 2,801,227, is a very satisfactory material to use in the winding operation.

The carriage is moved in its reciprocating path of travel by an endless chain 11 which is trained around a drive sprocket 12 and an idler sprocket 13. The carriage is connected to the chain 10 in a manner as described in the copending application, Ser. No. 337,321, filed Jan. 13, 1964, and now Patent No. 3,293,927, entitled Chain Locking Mechanism.

The mandrel 3 and carriage 10 are driven by a drive mechanism best shown in FIGS. 2 and 3. The drive mechanism includes a motor 14 which is mounted on a platform 15 attached to the interior wall 16 of the casing 1. The drive shaft of the motor is connected to a speed-reducing transmission 17, and the output shaft 18 of the speed-reducing transmission carries a sprocket 19. An endless chain 20 is engaged with sprocket 19 and the chain is trained over a series of sprockets 21–35 which are journalled on the wall 16. As shown in FIG. 2, sprocket 25 is mounted on a shaft 36 along with a gear 37. Rotation of the sprocket 25 by chain 20 rotates the gear 37 and the gear 37 acts through a gear train 38 in a manner described in the copending application Ser. No. 313,077, filed Oct. 1, 1963, and entitled Drive Mechanism, now abandoned, to drive the carriage 10 in a reciprocating path of travel along the length of the mandrel 3.

In addition to the sprocket 19, the output shaft 18 also carries a gear 39 which engages a gear 40 on shaft 41. A sprocket 42 is also secured to shaft 41 and drives a chain 43 which is engaged with a sprocket 44 of a differential gear unit 45.

As best shown in FIG. 6, sprocket 44 is secured to input bevel gear 46 which is journalled for rotation on shaft 47 and the shaft itself is mounted for rotation in a bearing 48 secured to wall 16. Bevel gear 46 is engaged with a gear 49 and gear 49 is mounted for rotation about the axis of a shaft 50 and is secured to the enlarged central portion of shaft 47 by the shaft 50. Thus rotation of input gear 46 serves to rotate gear 49 about the axis of shaft 47 and thereby drive the shaft 47. Secured to shaft 47 is an output sprocket 51 which is connected by chain 52 to a sprocket 53 on shaft 54. Shaft 54 also carries a gear 55 which engages a gear 56 on shaft 57. Shaft 57 is journalled in the wall 16 and rotation of the shaft 57 acts through beveled gears 58 to drive the drive spindle 5 of the mandrel 3. With this drive system, rotation of the shaft 18 acts through gears 39 and 40 and chain drive 43 to rotate the differential shaft 47, and this rotation is transmitted by chain drive 52 and gears 55 and 56 to rotate the mandrel 3.

A gear 59 is secured to a common shaft with the sprocket 29, and gear 59 engages a large gear 60 which is secured to a clutch disc 61 of a conventional pneumatic clutch 62. The clutch 62 also includes a second clutch disc 63 which is mounted on a shaft 64 journalled for rotation in a bearing 65 in wall 66. Secured to the shaft 64 is an elliptical gear 67 which meshes with an elliptical gear 68 carried on shaft 69. Shaft 69 is journalled in wall 66 by a bearing and the outer end of the shaft 69 carries a sprocket 71 which drives an endless chain 72. Chain 72 is trained around sprocket 73, 74 and 75. As best shown in FIG. 3, sprocket 75 is mounted on a shaft 76 along with a gear 77 and rotation of the gear 77 acts through a gear train 78 to drive gear 79.

The gear 79 is secured to a shaft 80 journalled within bearing 81 attached to the wall 66. The inner end of the shaft 80 is provided with an enlarged head which is formed with the recess 83. The head 82 of the shaft 80 is secured by bolts 84 to a bevel gear 85 of differential 45, and gear 85 engages gear 49. The gear 85 is journalled for rotation about the shaft 47 by a pair of bearings 86 which are retained on the shaft by a nut 87 located in recess 83.

When the clutch 62 is engaged, the gear 79 will be driven, and gear 79 will drive the input bevel gear 85 through the shaft 80.

In this situation, the speed of the gear 49 and output shaft 47 will be the sum of the speeds of the input gears 46 and 85, with the result that the mandrel will be driven at an increased rate of speed during the period that the clutch 62 is engaged.

The engagement of the clutch 62 is programmed with the movement of the carriage 10 so that the clutch will be engaged when the carriage reaches, or is approximately at, the end points of its stroke of travel. Engagement of the clutch will increase the speed of mandrel rotation while the carriage is at each end point of its stroke of travel. After the mandrel has been rotated through the desired arc, the clutch will be disengaged and the carriage will then begin its return stroke of travel.

The mechanism for engaging and disengaging the clutch includes a disc 88 which is secured to the clutch disc 63. The peripheral edge of the disc 88 is provided with a notch 89 or recess, and an ear 90 of arm 91 is adapted to engage the notch 89 and prevent rotation of the disc 88 and clutch disc 63. As best shown in FIG. 4, the lower end of the arm 91 is pivotally connected to plate 92, and the plate is mounted in spaced relation to the wall 16 by a series of rods 93. Opposite the ear 90 is a projection 94 which is pivotally secured within a yoke 95 connected to the end of a piston rod 96. The piston rod is connected to a piston mounted for movement in a pneumatic double acting cylinder 97, and the opposite end of the cylinder is pivotally connected to a plate 98 which in turn is connected by plate 99 to the plate 92.

Air is supplied to the opposite ends of the cylinder 97 through lines 100 and 101, and by supplying air through the line 101, the piston rod is moved inwardly to withdraw the ear 90 from the notch 89 in disc 88. With the locking ear 90 withdrawn, the clutch can then be engaged.

The carriage 10 is adapted to engage limit switches 102 and 103, monted on beam 2, as shown in FIG. 1, at the end points of its stroke of travel and engagement of each limit switch serves to supply a pulse of high pressure air through a conventional pneumatic valve mechanism to line 101 of cylinder 97 to thereby withdraw the ear 90 from the notch 89.

Simultaneously with the withdrawal of the ear 90 from the notch 89, the arm 91 is released from engagement with a limit switch 104 which is mounted on the plate 92.

Release of the limit switch 104 acts through a valve mechanism, as will be described hereinafter, to supply air to the clutch 62 to engage the clutch discs 61 and 63.

As the carriage 10 moves along the mandrel, the ear 90 of arm 91 is in engagement with notch 89 of disc 88. At this time low pressure air is supplied to the cylinder through line 100 to force the piston rod outwardly and urge the ear 90 into locking engagement with the notch 89. When the carriage reaches the end point of its stroke of travel, the carriage engages limit switch 102 which serves to supply a pulse of high pressure air through line 101 to cylinder 97 to thereby withdraw piston rod 96 and move the locking ear 90 out of engagement with the notch 89. Simultaneously, limit switch 104 is released which serves to supply air pressure to the clutch 62 to engage the same so that rotation of clutch disc 61 will be transmitted to clutch disc 63. As the locking ear 90 is out of engagement with the notch 89 at this time, the disc 88 can rotate along with the clutch disc 63. With the clutch engaged, the secondary drive will be driven to drive the input gear 85 of differential 45 and thereby increase the speed of mandrel rotation.

As the cam disc 88 rotates with the clutch disc 63, ear 90 is urged outwardly by the low pressure air acting through line 100 of cylinder 97 and rides on the outer cam surface of the disc 88. When the disc completes a 360° revolution, the ear 90 will fall into the notch 89 to lock the clutch disc 63 against rotation and simultaneously arm 91 will engage limit switch 104 to disengage the clutch 62. The engagement of ear 90 with notch 89 serves to lock the secondary drive at a precise position and thereby maintain the accurate programming between the mandrel and the carriage.

In some cases, the mandrel 3 will have a substantial diameter and may have considerable weight. Because of the inertia, it is difficult to control the deceleration of the mandrel after it has rotated rapidly through the 180° arc. The elliptical gears 67 and 68 provide a slow initial acceleration for the mandrel and a slow deceleration at the mandrel approaches the end point of its rapid rotational movement. In addition to the elliptical gears, a conventional pneumatic brake 105 is secured to the outer end of the spindle 5 and is mounted on the cabinet 1.

The brake 105 is employed to decelerate the speed of rotation of the mandrel during the last half of the rapid 180° rotational cycle. Air pressure to the brake 105 is controlled by an arm 106 which is mounted on the shaft 69 of sprocket 71. During rotation of the sprocket 71, the bracket 106 will rotate into engagement with limit switch 107 mounted on wall 66, and engagement of the limit switch 107 will serve to supply air pressure to the brake to aid in decelerating the mandrel.

FIG. 7 shows the pneumatic circuit for the invention. Air or other gas under pressure is supplied through line 108, and line 109 connects the air supply line 108 with the brake 105 through a shuttle valve 110. A conventional pressure regulator 111 is located in line 109 upstream of the valve 110. The shuttle valve 110 is the type having two pneumatic inputs and a single output which is connected to the brake 105. With this type shuttle valve, the higher pressure input will govern and that pressure will be applied to the brake 105.

The air supply line 108 is also connected by line 112 to one inlet of a valve 113 and by line 114 to an end port of valve 113. Clutch limit switch 104 is connected in line 114. Similarly, air supply line 108 is connected to an inlet of a valve 115 and is also connected to an end port in valve 115 by line 116. Brake limit switch 107 is located in line 116. In addition, line 117 connects valve 113 to valve 115, while line 118 connects valve 113 to the clutch 62. The valve 115 is connected to the shuttle valve 110 by line 119 and a pressure regulator 120 is located in line 119. The valves 113 and 115 are standard reciprocating plunger type valves with the plungers having the required passages to connect the desired air lines when the plungers are at either of their positions in the valve bodies.

During movement of the carriage, air is supplied through line 108 and acts through line 109. Pressure regulator 111 in line 109 regulates pressure to a low value, and this low pressure, in the neighborhood of about 5 p.s.i.g., is applied to the brake 105, providing a continual drag on the mandrel which is desirable when winding at low helix angles. At this time, line 112 is connected to line 117 through valve 113 so that the line 108 is connected to the closed plug 121 in valve 115. In this position, line 108 will not be in communication with line 119 through valve 115 so pneumatic pressure will not act through line 119 to the brake 105.

When the clutch limit switch 104 is disengaged by movement of the arm 91, air pressure will be supplied through line 114 to the valve 113 thereby moving the valve plunger against the force of a spring return to connect the line 112 with the line 118 to supply pneumatic pressure to the clutch 62 to engage the same and operate the secondary drive system. During operation of the secondary drive, the brake limit switch 107 will be engaged which will supply air through line 116 to move the plunger of valve 115 and thereby connect the air supply line 108 with line 119 and the air pressure in line 119 will be regulated by regulator 120 and supplied through the shuttle valve 110 at a higher pressure than the air supplied through line 109, with the result that the high pressure air will govern and will actuate the brake to decelerate the mandrel rotation.

The present invention provides an apparatus for speeding up the rotation of the mandrel at given points in winding cycle. The mechanism is particularly adapted for use in applying helical windings at a low helix angle where the mandrel is rotating very slowly with respect to carriage travel. In this case, the speed of the mandrel is increased when the carriage reaches its end point so that the overall winding operation is speeded up.

The differential gear unit enables the secondary drive, which is at a higher rate of speed, to be added to the normal speed of mandrel rotation so that the mandrel will rotate at a high rate of speed when the carriage is stopped. In addition, the clutch mechanism, which serves to engage the secondary drive, has a positive lock so that the secondary drive will be stopped at a precise location in the winding cycle which will maintain the programmed winding pattern throughout the entire winding operation.

The mechanism of the invention can also be used when applying straight longitudinal windings to the mandrel. In this case the mandrel is prevented from rotating as the carriage travels by not transmitting power to the bevel gear 49 of differential 45. This can be accomplished by locking the chain drive 43 against movement. The chain 43 can be locked by removing the gears 39 and 44 and connecting one end of a locking bar 122 to the shaft 41. The opposite end of bar 122 is provided with a notch 123 which engages one of the rods 124, as shown in FIG. 8.

While the above description has been directed to the use of a pneumatic clutch 62 and a pneumatic brake 105, it is contemplated that other conventional clutch and brake mechanisms can be used with comparable results.

Various modes of carrying out the invention are contemplated as being within the scope of the following claims particularly pointing out and distinctly claiming the subject matter which is regarded as the invention.

I claim:

1. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means operably connected to the mandrel for rotating the mandrel at a first speed, and means responsive to the carriage reaching a given point in said reciprocating path of travel for rotating said mandrel at a second speed faster than said first speed.

2. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means operably connected to the mandrel for rotating the mandrel at a first speed, and means responsive to the carriage reaching a given point in its reciprocating path of travel for rotating the mandrel through an arc less than 360° at a speed faster than said first speed.

3. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means operably connected to the mandrel for driving the mandrel at a first speed, third drive means operably connected to the mandrel for driving the mandrel at a second speed, clutch means for engaging and disengaging said third drive means, means for engaging said clutch means at predetermined periods during the winding cycle, and means interconnecting the second drive means and the third drive means for adding the speed of said third drive means to the speed of said second drive means when said clutch is engaged to thereby rotate the mandrel at a higher rate of speed.

4. In a filament winding apparatus, a mandrel mounted for rotation about the axis thereof, a carriage mounted for reciprocating movement along the length of the mandrel and disposed to wind a strand on the mandrel, first drive means to drive the carriage, second drive means connected to the first drive means, third drive means, clutch means interconnecting the first drive means and the third drive means, means for engaging the clutch at predetermined periods during the winding cycle, and differential means having an output connected to the mandrel and having one input connected to said second drive means and having a second input connected to said third drive means, said differential means combining the speed of said third drive means with the speed of said second drive means when said clutch is engaged to thereby increase the speed of rotation of the mandrel.

5. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means, third drive means, clutch means operably connected in said third drive means for engaging and disengaging said third drive means, means for engaging said clutch means at predetermined periods during the winding cycle, and differential means interconnecting said second drive means and said third drive means, said differential means having an output member connected to the mandrel and having one input member connected to said second drive means and having a second input member connected to said third drive means, said differential means combining the speed of said third drive means with the speed of said second drive means when said clutch is engaged to thereby increase the speed of rotation of the mandrel during said periods.

6. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means operably connected to the mandrel for rotating the mandrel at a low speed, means responsive to the carriage reaching an end point in its reciprocating path of travel for rotating the mandrel through a portion of a complete revolution at a high speed faster than said low speed, and brake means associated with said mandrel for decelerating the high speed rotation of the mandrel.

7. In a filament winding apparatus, a mandrel disposed to rotate about its axis, a carrige mounted for reciprocating travel along the length of the mandrel and disposed to wind a strand on the mandrel to form a tubular article, first drive means for driving the carriage in a reciprocating path of travel, second drive means operably connected to the mandrel for rotating the mandrel at a first speed, means responsive to the carriage reaching an end point in its reciprocating stroke of travel for rotating the mandrel through a given arc at a speed greater than said first speed, brake means associated with the mandrel, and means responsive to the mandrel rotating through a portion of said arc for actuating said brake means to decelerate the manderl.

8. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means, third drive means, clutch means operably connected in said third drive means for engaging and disengaging said third drive means, means responsive to the carriage reaching an end point in its reciprocating path of travel for engaging the clutch means, differential means having an output member connected to the mandrel and having an input member connected to said second drive means and having a second input member connected to said third drive means, said differential means combining the speed of said third drive means with the speed of said second drive means when the clutch means is engaged to thereby rotate the mandrel through a given arc at an increased speed of rotation, and means responsive to the mandrel rotating through said given arc for disengaging said clutch means.

9. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means, third drive means, clutch means operably connected in said third drive means for engaging and disengaging said third drive means, means responsive to the carriage reaching an end point in its reciprocating path of travel for engaging the clutch means, differential means having an output member connected to the mandrel and having an input member connected to said second drive means and having a second input member connected to said third drive means, said differential means combining the speed of said third drive means with the speed of said second drive means when the clutch means is engaged to thereby rotate the mandrel through a given arc at an increased speed of rotation, means responsive to the mandrel rotating through said given arc for disengaging said clutch means, brake means associated with the mandrel, and means responsive to the mandrel rotating through a portion of said arc for actuating said brake means and decelerating the mandrel.

10. The structure of claim 5 in which the third drive means has a substantially greater speed than said second drive means.

11. In a filament winding apparatus, a mandrel mounted for rotation about the axis thereof, a carriage mounted for reciprocating movement along the length of the mandrel and disposed to wind a strand on the mandrel, first drive means to drive the carriage, second drive means connected to the first drive means, third drive means, clutch means interconnecting the first drive means and the third drive means, means for engaging the clutch at predetermined periods during the winding cycle, differential means having an output connected to the mandrel and having one input connected to said second drive means and having a second input connected to said third drive means, said differential means combining the speed of said third drive means with the speed of said second drive means when said cltuch is engaged to thereby increase the speed of rotation of the mandrel, and means for increasing the output speed of said third drive means during the mid-portion of the period when the clutch means is engaged.

12. The structure of claim 11 in which said last named means constitutes a pair of elliptical gears.

13. In a filament winding apparatus, a mandrel disposed to rotate about its axis, a carriage mounted for reciprocating travel along the length of the mandrel and disposed to wind a strand on the mandrel to form a tubular article, first drive means for driving the carriage in a reciprocating path of travel, second drive means, third drive means, clutch means operably connected in said third drive means for engaging and disengaging said third drive means, means for engaging said clutch means at predetermined periods during the winding cycle, differential means having a first input gear connected to said second drive means and having an output gear engaged with said first input gear, said differential means also including a second input gear disposed in axial alignment with the first input gear and connected to said third drive means and engaged with said output gear, said differential means also having an output shaft connected for rotation with said output gear and journalled within said first and second input gears, and output drive means connecting the output shaft of said differential means and the mandrel, said differential means acting to combine the speed of said third drive means with the speed of said second drive means when the clutch is engaged to thereby increase the speed of rotation of the mandrel.

14. In a filament winding apparatus, a mandrel disposed to rotate about its axis, a carriage mounted for reciprocating travel along the length of the mandrel and disposed to wind a strand on the mandrel to form a tubular article, first drive means for driving a carriage in a reciprocating path of travel, second drive means operably connected to the mandrel for rotating the mandrel at a first speed about its axis, and means connected to the second drive means and responsive to the carriage reaching a predetermined position in its reciprocating path of travel for varying the speed of the second drive means to thereby rotate the mandrel at a second speed different from said first speed.

15. The apparatus of claim 14, and including means responsive to a given rotational movement of said mandrel at said second speed for disengaging said last named means and returning the speed of said second drive means to its original value to thereby rotate said mandrel at said first speed.

16. In a filament winding apparatus, a mandrel disposed to rotate about its axis, a carriage mounted for reciprocating travel along the length of the mandrel and disposed to wind a strand on the mandrel to form a tubular article, first drive means for driving a carriage in a reciprocating path of travel, second drive means operably connected to the mandrel for rotating the mandrel, means interconnecting said first drive means and said second drive means and operably connected to the mandrel and responsive to the carriage reaching a predetermined position in its reciprocating path of travel for adding the speed of said first drive means to the speed of said second drive means to thereby rotate the mandrel at a higher rate of speed.

References Cited
UNITED STATES PATENTS

| | | | |
|---|---|---|---|
| 2,989,256 | 6/1961 | Lee | 242—9 |
| 3,166,104 | 1/1965 | Foley et al. | 242—9 X |

FRANK J. COHEN, *Primary Examiner.*

BILLY S. TAYLOR, *Examiner.*